US011802378B2

(12) United States Patent
Kishimoto et al.

(10) Patent No.: US 11,802,378 B2
(45) Date of Patent: Oct. 31, 2023

(54) WATER-DISPERSIBLE PAPER (71) Applicant: NIPPON PAPER PAPYLIA CO., LTD., Fuji (JP)

(72) Inventors: Masaki Kishimoto, Tokyo (JP); Yoshiaki Ishino, Tokyo (JP)

(73) Assignee: NIPPON PAPER PAPYLIA CO., LTD., Fuji (JP)

( * ) Notice: Subject to any disclaimer, the term of this patent is extended or adjusted under 35 U.S.C. 154(b) by 289 days.

(21) Appl. No.: 17/436,059

(22) PCT Filed: Mar. 23, 2020

(86) PCT No.: PCT/JP2020/012730
§ 371 (c)(1),
(2) Date: Sep. 2, 2021

(87) PCT Pub. No.: WO2020/196408
PCT Pub. Date: Oct. 1, 2020

(65) Prior Publication Data
US 2022/0178080 A1 Jun. 9, 2022

(30) Foreign Application Priority Data
Mar. 28, 2019 (JP) ................................. 2019-062722

(51) Int. Cl.
*D21H 27/38* (2006.01)
*C09J 7/29* (2018.01)
*B32B 29/00* (2006.01)
*B32B 29/06* (2006.01)
*D21H 19/12* (2006.01)
*G09F 3/02* (2006.01)
*G09F 3/10* (2006.01)

(52) U.S. Cl.
CPC ........... *D21H 27/38* (2013.01); *B32B 29/005* (2013.01); *B32B 29/06* (2013.01); *C09J 7/29* (2018.01); *D21H 19/12* (2013.01); *G09F 3/02* (2013.01); *G09F 3/10* (2013.01); *B32B 2405/00* (2013.01); *C09J 2203/334* (2013.01); *C09J 2301/162* (2020.08); *C09J 2400/283* (2013.01)

(58) Field of Classification Search
CPC ......... D21H 27/38; D21H 19/12; C09J 17/29; B32B 29/005; B32B 29/06; G09F 3/02; G09F 3/10
USPC ....................................................... 162/130
See application file for complete search history.

(56) References Cited

U.S. PATENT DOCUMENTS

| 5,418,057 | A | 5/1995 | Tokiyoshi et al. |
| 5,722,433 | A * | 3/1998 | Ishino .................... D21H 19/44 |
| | | | 131/365 |
| 2006/0216537 | A1* | 9/2006 | Natsui .................... D21H 19/80 |
| | | | 162/137 |
| 2014/0045684 | A1 | 2/2014 | Koyama et al. |
| 2017/0233909 | A1 | 8/2017 | Wright et al. |
| 2017/0282520 | A1 | 10/2017 | Cabell et al. |
| 2020/0231844 | A1 | 7/2020 | Kishimoto et al. |

FOREIGN PATENT DOCUMENTS

| JP | H0949198 A | 2/1997 |
| JP | 2006299498 A | 11/2006 |
| JP | 2007237634 A | 9/2007 |
| JP | 6010461 B2 | 10/2016 |
| WO | WO2012014970 A1 | 9/2013 |
| WO | 2019049619 A1 | 3/2019 |

OTHER PUBLICATIONS

A Notice of Reasons for Refusal issued by the Japanese Patent Office dated Jun. 28, 2022, for Japanese counterpart application No. 2019-062722. (4 pages).
International Preliminary Report on Patentability, dated Sep. 28, 2021, for corresponding international application PCT/JP2020/012730 (1 page).
Notification Concerning Transmittal of International Preliminary Report on Patentability, dated Oct. 7, 2021, for corresponding international application PCT/JP2020/012730 (1 page).
Notification of Transmittal of Translation of the International Preliminary Report on Patentability, dated Oct. 7, 2021, for corresponding international application PCT/JP2020/012730 (1 page).
Written Opinion of the International Searching Authority, dated Jun. 23, 2020, for corresponding international application PCT/JP2020/012730 (6 page).
International Search Report (ISR) dated Jun. 23, 2020, issued for International application No. PCT/JP2020/012730. (3 pages).
Moriya, Masao, Characteristics of Papers and the Morphological Properties of Woods, Japan Tappi Journal, pp. 19-28, vol. 21, No. 31-7, Japan Technical Association of the Pulp and Paper Industry. (10 pages).
Extended European Search Report (EESR) dated Nov. 2, 2022, issued for European counterpart patent application No. EP20779961.0 (6 pages).

* cited by examiner

*Primary Examiner* — Mark Halpern
(74) *Attorney, Agent, or Firm* — Law Office of Katsuhiro Arai (57) ABSTRACT

An object is to provide a water-dispersible paper that exhibits excellent dispersibility in water. As a solution, a water-dispersible paper is provided, which has: a base paper that has a bulky layer containing 10% by weight or higher of a softwood pulp with a lumen width (l) to fiber diameter (D) ratio (l/D) of 0.60 or lower on average; and a water-soluble polymer impregnated into the base paper.

20 Claims, 1 Drawing Sheet

WATER-DISPERSIBLE PAPER

CROSS-REFERENCE TO RELATED APPLICATIONS

This application is the U.S National Phase under 35 U.S.C. § 371 of International Application PCT/JP2020/012730, filed Mar. 23, 2020, which claims priority to Japanese Patent Application No. JP2019-062722, filed Mar. 28, 2019. The International Application was published under PCT Article 21(2) in a language other than English.

TECHNICAL FIELD

The present invention relates to a water-dispersible paper that disperses quickly in water.

BACKGROUND ART

Water-dispersible papers that disperse quickly in water are used in applications where their dispersibility in water is taken advantage of, such as water-dispersible labels, papers for confidential documents, cleaning papers for toilets, bathrooms, etc., sanitary materials, medical materials, and agricultural materials. For example, Patent Literature 1 proposes a water-dispersible paper produced by compounding, at a specific compounding ratio, a refined pulp whose α cellulose content is 88% by weight or higher, and an unrefined pulp whose α cellulose content is under 88% by weight.

BACKGROUND ART LITERATURE

Patent Literature

Patent Literature 1: Japanese Patent No. 6010461

SUMMARY OF THE INVENTION

Problems to be Solved by the Invention

An object of the present invention is to provide a water-dispersible paper that exhibits excellent dispersibility in water.

Means for Solving the Problems

The means for achieving the object of the present invention are as follows:
1. A water-dispersible paper characterized in that it has:
   a base paper that has a bulky layer containing, a relative to a total amount of pulp contained in the bulky layer, 10% by weight or higher of a softwood pulp consistuted by pulp fibers with a lumen width (l) to fiber diameter (D) ratio (l/D) of 0.60 or lower on average; and
   a water-soluble polymer impregnated into the base paper.
2. The water-dispersible paper according to 1, characterized in that the freeness of the pulp constituting the bulky layer is 600 ml CSF or higher but no higher than 750 ml CSF.
3. The water-dispersible paper according to 1 or 2, characterized in that the base paper has, at least on one surface, a dense layer containing, relative to a total amount of pulp contained in the dense layer, 30% by weight or higher of a softwood pulp constituted by pulp fibers with a lumen width (l) to fiber diameter (D) ratio (l/D) exceeding 0.60 on average.
4. The water-dispersible paper according to 3, characterized in that the freeness of the pulp constituting the dense layer is 450 ml CSF or higher but no higher than 600 ml CSF.
5. The water-dispersible paper according to any one of 1 to 4, characterized in that the water-soluble polymer comprises either one or both of a carboxyalkyl cellulose salt and a dextrin.
6. A water-dispersible label, made of the water-dispersible paper according to any one of 1 to 5 with an adhesive layer provided on one side.
7. An information sheet, made of the water-dispersible paper according to any one of 1 to 5.

Effects of the Invention

The water-dispersible paper proposed by the present invention exhibits excellent dispersibility in water. As it uses a base paper having a dense layer on its surface, the water-dispersible paper proposed by the present invention demonstrates excellent printability and can therefore be used favorably for water-dispersible labels, papers for confidential documents, etc. The water-dispersible paper proposed by the present invention achieves excellent dispersibility in water, as well as printability, just by using a specific softwood pulp, and its cost is much lower compared to the conventional water-dispersible papers. Also, because of its high composition percentage of biomaterials such as softwood pulp, the water-dispersible paper proposed by the present invention has lower environmental burdens when dispersed in water or otherwise released into the environment.

MODE FOR CARRYING OUT THE INVENTION

[Water-Dispersible Paper]
The water-dispersible paper proposed by the present invention is characterized in that it has: a base paper that has a bulky layer containing 10% by weight or higher of a softwood pulp with a lumen width (l) to fiber diameter (D) ratio (l/D) of 0.60 or lower on average; and a water-soluble polymer impregnated into this base paper.

Hereinafter in this Specification, the lumen width (l) to fiber diameter (D) ratio (l/D) may also be referred to simply as "l/D."

l/D

Figure 1:
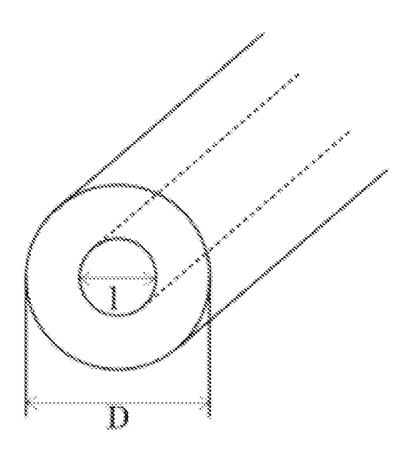
FIG. 1 A schematic view of a cross-section of a pulp.

FIG. 1 shows a schematic view of a cross-section of a pulp fiber. What is generally called a "pulp fiber" (which may be referred to as a "pulp") is primarily constituted by a tracheid in a softwood pulp, or a wood fiber in a hardwood pulp, both having an inner cavity called a "lumen" inside. "l/D" is a value indicating the percentage of the thickness of the fiber accounted for by the lumen, and the smaller this value, the smaller the lumen and the thicker the fiber wall.

In this Specification, the l/D of a pulp can be measured according to the procedure below:
1. Dilute a suspension of the pulp to a concentration of 0.05 percent.
2. Drip the diluted suspension onto a clean glass slide using a pipette, evenly spread the fibers using a dissecting needle, if necessary, and dry the suspension.

3. Drip 3 drops of Graff "C" stain solution onto the fibers spread on the glass slide, put a glass cover slip on top in such a way that air bubbles will not enter, and remove excess stain solution using an absorbent paper, to produce a prepared slide.
4. Observe the prepared slide using an optical microscope and, by moving the prepared slide in the lateral and longitudinal directions on a moving stage, measure the fiber diameters (D) and lumen widths (l) to calculate the l/Ds.

When preparing a paper material, the l/Ds of at least 100 fibers of the pulp to be compounded are obtained according to the aforementioned method, and their average value can be used as the l/D of the pulp.

When a paper has already been formed, the paper can be disintegrated in the same manner as that in preparing a slurry for measuring a disintegration freeness of paper, after which a dye solution that manifests different colors according to the types of trees, etc., is used to discriminate the pulp type using at least 200 pulp fibers, while their l/Ds are obtained according to the aforementioned method, thereby obtaining the compounding quantity of the softwood pulp and the l/D of the pulp.

Base Paper

The base paper used under the present invention has at least a bulky layer. The number of base paper layers, although not limited in any way, is preferably one or more but no more than three because the manufacturing becomes complicated when there are more layers.

Bulky Layer

In the water-dispersible paper proposed by the present invention, the bulky layer contains 10% by weight or higher of a softwood pulp whose l/D is 0.60 or lower, relative to the total quantity of pulps in the layer.

The bulky layer only needs to contain 10% by weight or higher of the softwood pulp whose l/D is 0.60 or lower, relative to the total quantity of pulps therein, and other pulps may be compounded in it. The compounding quantity of the softwood pulp whose l/D is 0.60 or lower relative to the total quantity of pulps in the bulky layer is preferably 30% by weight or higher, or more preferably 50% by weight or higher, or yet more preferably 70% by weight or higher.

Softwood Pulp Whose l/D is 0.60 or Lower

A softwood pulp whose l/D is 0.60 or lower forms a low-density, bulky sheet made of fiber walls that are thick and do not crush easily. Also, a sheet formed by a softwood pulp whose l/D is 0.60 or lower has fewer inter-fiber bonds and thus disperses easily in water. Since a pulp with a lower l/D disperses more easily in water, the l/D of the softwood pulp whose l/D is 0.60 or lower is preferably 0.55 or lower, or more preferably 0.50 or lower, or yet more preferably 0.45 or lower.

The softwood pulp whose l/D is 0.60 or lower is not limited in any way, and may comprise one type, or two or more types compounded together, selected from mechanical pulps (MP), thermo-mechanical pulps (TMP), sulfite pulps (SP), kraft pulps (KP), and bleached pulps (BP), or unbleached pulps (UP), based on the foregoing, etc., whose l/D is 0.60 or lower. Among these, kraft pulps (KP) and sulfite pulps (SP) are preferred for their excellent strength.

Other Pulps

As for other pulps to be combined with the softwood pulp whose l/D is 0.60 or lower, any of softwood pulps whose l/D exceeds 0.60, hardwood pulps, regenerated cellulose and mercerized pulps, dissolving pulps and other refined pulps, as well as non-wood pulps such as hemp, kenaf, kozo, mitsumata and other bast fibers, bagasse, bamboo, esparto and other hard fibers, cotton linter and other seed hair fibers, manila hemp, sisal hemp and other leaf vein fibers, etc., may be used without limitation.

The l/Ds of other pulps are not limited in any way and may exceed 0.60. It should be noted, however, that, if the l/Ds of other pulps are higher, dispersibility in water tends to drop and therefore the compounding quantity of the softwood pulp whose l/D is 0.60 or lower must be increased.

Preferably the bulky layer does not contain any fibrous carboxymethyl cellulose or alkali salt thereof as papermaking fibers.

A fibrous carboxymethyl cellulose, which is insoluble in water, becomes soluble in water in an alkali salt form. Accordingly, in many cases a carboxymethyl cellulose is compounded as papermaking fibers for use in forming a water-dispersible paper, and after the paper is formed, the fibrous carboxymethyl cellulose is changed to a sodium salt using an alkalizing agent. It should be noted, however, that an alkali derived by the alkalizing agent can have adverse effects, and it also tends to discolor (yellowing) the paper.

Preferably the pulp with which to constitute the bulky layer is beaten to a freeness (Canadian Standard Freeness: CSF) of 600 ml CSF or higher but no higher than 750 ml CSF. If the freeness is lower than 600 ml CSF (the pulp is beaten further), dispersibility in water will drop. If the freeness is higher than 750 ml CSF, forming a paper may become difficult. The freeness (Canadian Standard Freeness: CSF) is preferably 620 ml CSF or higher but no higher than 720 ml CSF, or more preferably 640 ml CSF or higher but no higher than 700 ml CSF.

The beating of pulp suspension is not limited to beating a suspension consisting only of the softwood pulp, but it may also involve mixing the softwood pulp and other pulps together and then beating the mixture, or beating the softwood pulp and other pulps separately and then mixing them together (separate beatings). In the case of separate beatings, the freeness of each pulp is not limited in any way, but it should be adjusted so that the freeness of the pulp suspension into which each pulp has been mixed and from which the bulky layer is to be formed will have a freeness in the aforementioned range of 600 ml CSF or higher but no higher than 750 ml CSF.

If necessary, the paper material from which to form the bulky layer may have, in addition to the aforementioned pulps, any known additive selected and compounded in it as deemed appropriate, such as polyacrylic amide-based polymer, polyvinyl alcohol-based polymer, cationized starch, any of various modified starches or other dry paper strength enhancing agent, yield improving agent, drainage enhancing agent, coagulant, bulking agent, dye, fluorescent whitening agent, pH adjusting agent, defoaming agent, ultraviolet protective agent, fading inhibitor, pitch controlling agent, slime controlling agent, etc., to the extent that dispersibility in water will not be reduced.

However, preferably the paper material from which to form the bulky layer does not contain any filler, sizing agent, etc. Particularly when it contains calcium carbonate as a filler, use of a carboxymethyl cellulose salt as the below-mentioned water-soluble polymer will produce a calcium salt and the solubility in water may drop as a result.

Dense Layer

Preferably the base paper has a dense layer at least on one side, and more preferably it has a dense layer on both sides.

The dense layer contains 30% by weight or higher of a softwood pulp whose l/D exceeds 0.60, relative to the total quantity of pulps in the layer. The dense layer only needs to contain 30% by weight or higher of the softwood pulp whose l/D exceeds 0.60, relative to the total quantity of pulps therein, and other pulps may be compounded in it. It should be noted, however, that the dense layer and bulky layer are not formed from the same paper material. The compounding quantity of the softwood pulp whose l/D exceeds 0.60, relative to the total quantity of pulps in the dense layer, is preferably 50% by weight or higher, or more preferably 70% by weight or higher.

Softwood Pulp Whose l/D Exceeds 0.60

A softwood pulp whose l/D exceeds 0.60 has thin fiber walls that crush and flatten easily during papermaking. The resulting paper takes a sheet shape as the pulp fibers crushed during papermaking stack on top of, and contact with, each other to generate inter-fiber bonds, which means that a pulp with a higher l/D can be manufactured into a highly dense sheet.

Since a sheet having better shielding property can be obtained from a pulp with a higher l/D, the l/D of the softwood pulp whose l/D exceeds 0.60 is preferably 0.65 or higher, or more preferably 0.70 or higher, or yet more preferably 0.75 or higher.

The softwood pulp whose l/D exceeds 0.60 is not limited in any way, and may comprise one type, or two or more types compounded together, selected from mechanical pulps (MP), thermo-mechanical pulps (TMP), sulfite pulps (SP), kraft pulps (KP), and bleached pulps (BP), or unbleached pulps (UP) based on the foregoing, etc., whose l/D exceeds 0.60. Among these, kraft pulps (KP) and sulfite pulps (SP) are preferred for their excellent strength.

Other Pulps

As for other pulps to be combined with the softwood pulp whose l/D exceeds 0.60, any of softwood pulps whose l/D is 0.60 or lower, hardwood pulps, and non-wood pulps such as hemp, kenaf, kozo, mitsumata and other bast fibers, bagasse, bamboo, esparto and other hard fibers, cotton linter and other seed hair fibers, manila hemp, sisal hemp and other leaf vein fibers, etc., may be used without limitation. It should be noted, however, that shielding property tends to drop when softwood pulps whose l/D is 0.60 or lower are contained, and therefore the compounding quantity of such softwood pulps is preferably 50% by weight or lower, or more preferably 30% by weight or lower, or yet more preferably 10% by weight or lower, relative to the total quantity of pulps forming the dense layer.

The l/Ds of other pulps are not limited in any way and may be 0.60 or lower. It should be noted, however, that, if the l/Ds of other pulps are lower, shielding property tends to drop and therefore the compounding quantity of the softwood pulp whose l/D exceeds 0.60 must be increased.

Just like the bulky layer, preferably the dense layer does not contain any fibrous carboxymethyl cellulose or alkali salt thereof as papermaking fibers. In addition, preferably the dense layer does not contain any regenerated cellulose fibers as papermaking fibers.

Regenerated celluloses are not suitable because the resulting sheet will lack strength and smoothness, leading to poor printability.

Preferably the pulp with which to constitute the dense layer is beaten to a freeness (Canadian Standard Freeness: CSF) of 450 ml CSF or higher but no higher than 600 ml CSF. If the freeness is lower than 450 ml CSF (the pulp is beaten further), dispersibility in water will drop. If the freeness is higher than 600 ml CSF, the resulting sheet will lack smoothness, potentially leading to poor printability. Preferably the freeness (Canadian Standard Freeness: CSF) is 475 ml CSF or higher but no higher than 575 ml CSF, or more preferably 500 ml CSF or higher but no higher than 550 ml CSF.

The beating of pulp suspension is not limited to beating a suspension consisting only of the softwood pulp, but it may also involve mixing the softwood pulp and other pulps together and then beating the mixture, or beating the softwood pulp and other pulps separately and then mixing them together (separate beatings). In the case of separate beatings, the freeness of each pulp is not limited in any way, but it should be adjusted so that the freeness of the pulp suspension into which each pulp has been mixed and from which the dense layer is to be formed will have a freeness in the aforementioned range of 450 ml CSF or higher but no higher than 600 ml CSF.

If necessary, the paper material from which to form the dense layer may have, in addition to the aforementioned pulps, any known additive selected and compounded in it as deemed appropriate, such as polyacrylic amide-based polymer, polyvinyl alcohol-based polymer, cationized starch, any of various modified starches or other dry paper strength enhancing agent, yield improving agent, drainage enhancing agent, coagulant, bulking agent, dye, fluorescent whitening agent, pH adjusting agent, defoaming agent, ultraviolet protective agent, fading inhibitor, pitch controlling agent, slime controlling agent, etc., to the extent that dispersibility in water will not be reduced. It should be noted that, preferably, the paper material from which to form the dense layer does not contain any filler, sizing agent, etc.

Water-Soluble Polymer

The water-dispersible paper proposed by the present invention contains a water-soluble polymer. The water-soluble polymer is impregnated into the base paper and filled at least partially in the voids between the fibers of the base paper. The water-dispersible paper proposed by the present invention demonstrates excellent dry strength because the water-soluble polymer is filled in the voids between the fibers of the base paper. Also, the water-dispersible paper proposed by the present invention has excellent dispersibility in water because, when it comes in contact with water, the water-soluble polymer present in the voids between the fibers will swell and push apart the fibers to make them dissociate easily.

For the water-soluble polymer, any such polymer that redissolves easily in water may be used without limitation. Specific examples include carboxyalkyl cellulose salt, alginic acid salt, pectic acid salt, polyacrylic acid salt, polymethacrylic acid salt, carboxyalkylated starch, phosphate esterified starch, anionic polyacrylamide, or other anionic polymer electrolyte salt, methyl cellulose, hydroxyalkyl cellulose, polyvinyl alcohol, polyvinyl pyrrolidone, polyalkylene oxide, polyvinyl alkyl ether, hydroxyalkylated starch, oxidized starch, pregelatinized starch, or other polymer nonelectrolyte, guar gum, trant gum, xanthan gum, gum arabic, carrageenan, galactomannan, pullulan, dextran, dextrin, or other water-soluble polysaccharide, gelatin, casein, or other water-soluble protein, etc., of which one type may be used alone or two or more types may be combined. Among these, a sodium salt of carboxyalkyl cellulose or dextrin is preferred from the viewpoints of dispersibility in water and dry strength. It should be noted that the carboxyalkyl cellulose salt used as the water-soluble polymer to be impregnated into the base paper is a different substance with a completely different shape from any sodium salt of fibrous carboxyalkyl cellulose being papermaking fibers that are preferably not contained in the water-dispersible paper proposed by the present invention. Also, from the viewpoint of preventing the print head and other metal members from corroding, a water-soluble polymer having a neutral pH of 6 or higher but no higher than 8 in a 1.0% by weight aqueous solution is preferred.

Preferably the water-soluble polymer has a Brookfield viscosity in a 2% by weight aqueous solution at 20° C. (hereinafter also referred to simply as "Brookfield viscosity") of 1 mPa·s or higher but no higher than 200 mPa·s. A water-soluble polymer that satisfies this numerical range with its type B viscosity permeates easily into the voids between the fibers and thus improves dispersibility of the water-dispersible paper in water. The Brookfield viscosity of the water-soluble polymer is preferably 2 mPa·s or higher but no higher than 130 mPa·s, or more preferably 3 mPa·s or higher but no higher than 40 mPa·s.

Water-Dispersible Paper

<Dispersibility in Water>

Dispersibility of the water-dispersible paper in water can be evaluated based on the small floc state dispersion time in water and fibrous dispersion time in water. The small floc state dispersion time in water represents the time it takes for one 3-cm square test piece to break into two or more thin pieces after the test piece has been introduced into a 300-ml beaker containing 300 ml of deionized water being agitated with a stirrer at 650 rpm, while the fibrous dispersion time in water represents the time it takes for one 3-cm square test piece to completely disintegrate into individual fibers after the test piece has been introduced into a 300-ml beaker containing 300 ml of deionized water being agitated with a stirrer at 650 rpm.

The water-dispersible paper proposed by the present invention has a small floc state dispersion time in water of within 15 seconds and a fibrous dispersion time in water of within 180 seconds. The small floc state dispersion time in water is more preferably within 10 seconds, or yet more preferably within 5 seconds. Also, the fibrous dispersion time in water is more preferably within 120 seconds, or yet more preferably within 90 seconds. If these times get longer, dispersibility in water will drop and may cause clogging of drain pipes, etc.

<Paper Surface pH>

The paper surface pH of the water-dispersible paper proposed by the present invention is in the neutral region of 6 or higher but no higher than 8. By adjusting the paper surface pH to fall in this range, adverse effects of acids or alkalis can be prevented. Preferably the paper surface pH is 6.2 or higher but no higher than 7.2.

Under the present invention, the method for adjusting the paper surface pH is not limited in any way, and the water-dispersible paper is manufactured using materials in the neutral region as primary components. Alternatively, it can be manufactured by neutralizing an alkaline or acidic water-dispersible paper with an acidic substance or alkaline substance.

Method for Manufacturing Water-Dispersible Paper

The water-dispersible paper proposed by the present invention may be manufactured using any known paper-making technology. Any paper machine may be used, such as cylinder paper machine, inclined short-Fourdrinier paper machine, Fourdrinier paper machine, twin-wire paper machine, or multi-layer paper machine combining the foregoing, according to the required strength and dispersibility in water. If a cylinder paper machine is used, for example, a base paper that has high anisotropy strength in that it is weaker in the horizontal direction than in the longitudinal direction, and thus breaks easily in the horizontal direction into thin strips in water, can be manufactured.

The basis weight of the water-dispersible paper is preferably in a range of 10 g/m$^2$ or more but no more than 200 g/m$^2$, or more preferably in a range of 50 g/m$^2$ or more but no more than 120 g/m$^2$. If the basis weight is under 10 g/m$^2$, strength may become insufficient. If the basis weight is greater than 200 g/m$^2$, on the other hand, dispersibility in water may drop.

Additionally, if the base paper of the water-dispersible paper proposed by the present invention has a bulky layer and a dense layer, the basis weight of each layer is normally in a range of 5 g/m$^2$ or more but no more than 100 g/m$^2$, or preferably in a range of 10 g/m$^2$ or more but no more than 100 g/m$^2$.

The method for impregnating the water-soluble polymer into the base paper is not limited in any way, but impregnation treatment with a mangle, sizing press, etc., or surface coating with a gate roll coater, blade coater, bar coater, gravure coater, die coater, curtain coater, spray coater, etc., may be selected and used as deemed appropriate, where impregnation treatment with a sizing press is preferred from the viewpoint of productivity.

Under the present invention, preferably the additive quantity (dry weight) of the water-soluble polymer is 2% by weight or higher but no higher than 14% by weight, relative to the total quantity of pulps. If the additive quantity of the water-soluble polymer is under 2% by weight relative to the total quantity of pulps, the effects of improving dispersibility in water or strength may not be sufficient. Also, an additive quantity greater than 14% by weight produces no effects of further improving dispersibility in water and strength. The additive quantity (dry weight) of the water-soluble polymer is preferably 3% by weight or higher but no higher than 12% by weight, or more preferably 6% by weight or higher but no higher than 10% by weight, relative to the total quantity of pulps.

<Additional Treatment of Water-Dispersible Paper>

The water-dispersible paper proposed by the present invention may be calendered using any general papermaking calender such as machine calender, super calender, soft nip calender, etc., to improve its smoothness for use in printing applications, etc. In this case, softwood pulps with high l/Ds are crushed easily, which means that a water-dispersible paper having a dense layer will see its shielding property and smoothness improve because the pulp constituting its dense layer is compressed preferentially to become dense.

The water-dispersible paper proposed by the present invention may be used in printing applications, etc. Various printing methods are available that are suitable for different applications, such as gravure printing, offset printing, and flexographic printing. Among these, the commonly-used gravure printing method is a method whereby inks are filled in the concave parts formed on the surface of a plate, called "cells", to be transferred onto a paper. This means that, when the plate comes in contact with the paper during gravure printing, adhesion between the paper surface and the plate will improve if the paper has high surface smoothness, and an excellent print finish will be achieved. If the paper has low surface smoothness, on the other hand, adhesion between the paper surface and the plate will drop, often creating a problem of failure in transferring ink on the paper and creating unprinted dots (hereinafter "missing dots"), and resulting in a poor print finish.

Normally, water-dispersible papers are constituted to have many voids so that their dispersibility in water will be retained, the result of which is low surface smoothness and susceptibility to missing dots. The water-dispersible paper proposed by the present invention, which has a dense layer on its surface, can have improved surface smoothness while remaining dispersible in water and thus ensures an excellent print finish, so long as the pulp constitutions of the bulky layer and dense layer are as mentioned above.

[Adhesive Layer]

The water-dispersible paper proposed by the present invention may have an adhesive layer at least on one side of the base paper.

The adhesive that constitutes the adhesive layer of the water-dispersible paper is preferably an adhesive having solubility or redispersibility in water, or more preferably a water-soluble acrylic-based adhesive or water-redispersible acrylic-based adhesive. Examples of water-soluble acrylic-based adhesives include, for example, those that contain, as a base polymer, any of copolymers constituted by alkoxy alkyl acrylate, styrene sulfonic acid salt, and other copolymeric monomers, or copolymers constituted by (meth) acrylic acid or other carboxyl group-containing vinyl-based monomers, hydroxyl group-containing monomers, and if used depending on the situation, other copolymerizable monomers. Examples of water-redispersible acrylic-based adhesives include, for example, those that contain, as a base polymer, any of copolymers constituted by (meth)acrylic acid alkyl ester, carboxyl group-containing vinyl-based monomers, alkoxy group-containing vinyl-based monomers, and if used depending on the situation, other copolymerizable monomers, or copolymers obtained through copolymerization of carboxylated rosin ester-containing vinyl-based monomers, carboxyl group-containing vinyl-based monomers and water-soluble vinyl-based monomers. It should be noted that the carboxyl groups in these copolymers may be of a type of salt that has been partially or entirely neutralized with an alkali as necessary, where an alkali metal salt, amine salt, or alkanol amine salt is used favorably for this alkali.

If a water-soluble acrylic-based adhesive or water-redispersible acrylic-based adhesive is used, the adhesive layer coating solution with which to form an adhesive layer may have a crosslinking agent compounded in it to adjust the adhesive force or solubility or dispersibility in water. Such crosslinking agent is not limited in any way, and any crosslinking agent commonly used in conventional acrylic-based adhesives may be used. Examples include 1,2-ethylene diisocyanate and other isocyanate-based crosslinking agents, diglycidyl ethers and other epoxy-based crosslinking agents, melamine resins, urea resins, dialdehydes, methylol polymers, metal chelate compounds, metal alkoxides, metal salts, etc. Furthermore, the adhesive layer coating solution may have any conventionally known plasticizer, tackifier, colorant, thickening agent, defoaming agent, leveling agent, antifungal agent, antioxidant, etc., compounded in it as deemed appropriate in order to adjust its properties and enhance its performance as necessary. Here, preferred plasticizers and tackifiers are those soluble or dispersible in water, where such plasticizers include, for example, sugar alcohols and other polyalcohols, polyether polyols, and alkanol amine salts of rosin oxides, etc., while such tackifiers include, for example, alkali metal salts of rosin, disproportionated rosin, hydrogenated rosin, etc., ammonium salts, and polyether esters, etc.

An adhesive layer may be provided by directly coating the adhesive layer coating solution at least on one side of the base paper, or an adhesive layer that has been formed on a release sheet may be transferred onto the base paper. An adhesive layer may be provided at least on one side of the base paper in a manner covering the surface entirely or partially. Providing an adhesive layer partially allows, for example, for easy releasing of a release paper attached over the adhesive layer.

The coating weight of the adhesive layer is preferably 3 $g/m^2$ or more but no more than 60 $g/m^2$, or more preferably 10 $g/m^2$ or more but no more than 50 $g/m^2$, in solids content. If the adhesive coating weight is under 3 $g/m^2$, the bonding performance of the obtained adhesive sheet will become insufficient; if it exceeds 60 $g/m^2$, on the other hand, the adhesive will likely ooze out during the manufacturing of the adhesive sheet or in post processes, which is not desired.

Preferably a release sheet is attached over the adhesive layer to prevent it from sticking unnecessarily except when in use, so that the release sheet would be peeled as desired at the time of use. The release sheet is not limited in any way, and any of conventionally known release sheets, such as glassine paper, coated paper, cast coated paper and other paper base materials, laminated papers comprising these paper base materials having polyethylene or other thermoplastic resin laminated thereon, as well as polyethylene terephthalate, polypropylene, polyethylene, and various other plastic films coated with a silicone resin or other release agent on one side or both sides, may be used. The basis weight of the release sheet is not limited in any way, but normally 20 $g/m^2$ or more but no more than 120 $g/m^2$ or so.

Also, an adhesive may be partially applied by a printing method on one side of base papers in dotted, rectangular or other discontinuous patterns, with a release agent partially applied on the other side of the base papers in patterns matching the adhesive patterns, after which the base papers are stacked with their partial adhesive application side and partial release-agent application side facing each other, to form a laminate of water-dispersible papers requiring no release sheet.

EXAMPLES

The present invention is explained below using examples; it should be noted, however, that the present invention is not limited to the following examples.

Example 1

A handmade paper was produced that had a bulky layer made from a paper material constituted by a bleached softwood kraft pulp (l/D=0.42) that had been beaten to a Canadian Standard Freeness of 700 ml CSF. This handmade paper was impregnation-treated by the sizing press method (hereinafter referred to as "sizing-press-coated") with an aqueous solution (pH 7.1) of a sodium salt of carboxymethyl cellulose (product name SUNROSE, manufactured by Nippon Paper Industries Co., Ltd., Brookfield viscosity 5 mPa·s) (hereinafter referred to as "CMC") as a water-soluble polymer by 8% by weight relative to the handmade paper, to produce a coated paper. Furthermore, the coated paper was calendered to achieve a target thickness of 72 to 74 μm, to produce a water-dispersible paper.

Example 2

A water-dispersible paper was produced in the same manner as in Example 1, except that a paper material constituted by a mixed pulp comprising 50 parts by weight of a bleached softwood kraft pulp (l/D=0.42) and 50 parts by weight of a bleached hardwood kraft pulp (l/D=0.34), which had been beaten to a Canadian Standard Freeness of 640 ml CSF, was used.

Example 3

A water-dispersible paper was produced in the same manner as in Example 1, except that a dense layer made from a paper material constituted by a mixed pulp comprising 30 parts by weight of a bleached softwood kraft pulp (l/D=0.85) and 70 parts by weight of a bleached hardwood kraft pulp (l/D=0.55), which had been beaten to a Canadian Standard Freeness of 525 ml CSF, was lamination-bonded and stacked on both sides of a bulky layer made from the mixed pulp used in Example 2, to the weight ratios of dense layer:bulky layer:dense layer=1:2:1, to produce a handmade paper of three-layer structure.

Example 4

A water-dispersible paper was produced in the same manner as in Example 3, except that the mixed pulp to be compounded in the dense layer was beaten to a Canadian Standard Freeness of 590 ml CSF.

Example 5

A water-dispersible paper was produced in the same manner as in Example 3, except that the mixed pulp to be compounded in the dense layer was changed to a mixed pulp comprising 50 parts by weight of a bleached softwood kraft pulp (l/D=0.85) and 50 parts by weight of a bleached hardwood kraft pulp (l/D=0.55).

Example 6

A water-dispersible paper was produced in the same manner as in Example 3, except that the mixed pulp to be compounded in the dense layer was changed to a mixed pulp comprising 30 parts by weight of a bleached softwood kraft pulp (l/D=0.85) and 70 parts by weight of a bleached hardwood kraft pulp (l/D=0.34).

Example 7

A water-dispersible paper was produced in the same manner as in Example 3, except that the mixed pulp to be compounded in the bulky layer was changed to a mixed pulp comprising 70 parts by weight of a bleached softwood kraft pulp (l/D=0.42) and 30 parts by weight of a bleached softwood kraft pulp (l/D=0.85).

Example 8

A water-dispersible paper was produced in the same manner as in Example 3, except that the handmade paper was sizing-press-coated with an aqueous solution (pH 7.2) of a CMC (product name SUNROSE FT-3, manufactured by Nippon Paper Industries Co., Ltd., Brookfield viscosity 94 mPa·s) as a water-soluble polymer by 5% by weight relative to the handmade paper.

Example 9

A water-dispersible paper was produced in the same manner as in Example 4, except that the handmade paper was sizing-press-coated with an aqueous solution (pH 7.0) of a dextrin (product name High Coaster, manufactured by Sanwa Starch Co., Ltd., Brookfield viscosity 3 mPa·s) as a water-soluble polymer by 5% by weight relative to the handmade paper.

Example 10

A water-dispersible paper was produced in the same manner as in Example 4, except that the handmade paper was sizing-press-coated with an aqueous solution of a mixture of a CMC (product name SUNROSE FT-3, manufactured by Nippon Paper Industries Co., Ltd., Brookfield viscosity 94 mPa·s) and a dextrin (product name High Coaster, manufactured by Sanwa Starch Co., Ltd., Brookfield viscosity 3 mPa·s) as water-soluble polymer so that the CMC would account for 1% by weight and the dextrin, 7% by weight, in the handmade paper.

Example 11

A water-dispersible paper was produced in the same manner as in Example 3, except that the second dense layer was not provided, and the paper had a two-layer structure comprising a dense layer and a bulky layer.

Example 12

A water-dispersible paper was produced in the same manner as in Example 3, except that a paper material constituted by a bleached hardwood kraft pulp (l/D=0.34) that had been beaten to a Canadian Standard Freeness of 525 ml CSF, was used for the dense layer.

Example 13

A water-dispersible paper was produced in the same manner as in Example 3, except that the mixed pulp to be compounded in the dense layer was beaten to a Canadian Standard Freeness of 620 ml CSF.

Example 14

A water-dispersible paper was produced in the same manner as in Example 1, except that a paper material constituted by a mixed pulp comprising 30 parts by weight of a bleached softwood kraft pulp (l/D=0.42) and 70 parts by weight of a bleached hardwood kraft pulp (l/D=0.34), which had been beaten to a Canadian Standard Freeness of 630 ml CSF, was used.

Comparative Example 1

A water-dispersible paper was produced in the same manner as in Example 1, except that no CMC was coated.

Comparative Example 2

A water-dispersible paper was produced in the same manner as in Example 1, except that a paper material constituted by a bleached softwood kraft pulp (l/D=0.85) that had been beaten to a Canadian Standard Freeness of 640 ml CSF, was used.

Comparative Example 3

A water-dispersible paper effectively comprising a single dense layer was produced in the same manner as in Example 3, except that no bulky layer was provided.

Comparative Example 4

A water-dispersible paper was produced in the same manner as in Example 3, except that the mixed pulp to be compounded in the bulky layer was changed to only a bleached softwood kraft pulp (l/D=0.85).

The obtained water-dispersible papers were evaluated as follows. The results are shown in Table 1.

Basis Weight, Thickness, Density

The basis weight was measured according to JIS P8124.

The thickness of one sheet was measured according to JIS P8118 by adjusting the pressure between the pressure surfaces to 100 kPa.

The measured basis weight (g/m²) was divided by the thickness (μm) to calculate the density.

Small Floc State Dispersion Time in Water

The dispersion time in water was measured according to the aforementioned method and evaluated according to the criteria below:
- ⊚: The small floc state dispersion time in water is within 10 seconds and the fibrous dispersion time in water is within 90 seconds.
- ○: The small floc state dispersion time in water is within 15 seconds and the fibrous dispersion time in water is within 180 seconds, except when "0: The small floc state dispersion time in water is within 10 seconds and the fibrous dispersion time in water is within 90 seconds" above applies.
- x: The small floc state dispersion time in water exceeds 15 seconds or the fibrous dispersion time in water exceeds 180 seconds. It is evaluated that dispersing the paper in water is difficult.

Printability Test

The water-dispersible paper was gravure-printed using a National Printing Bureau-type gravure printing tester, after which the number of missing dots in 30-percent gradation dot areas was counted to calculate the percentage of missing dots to normal dots, and the result was evaluated according to the criteria below. It should be noted that, in Example 11, the dense layer surface is the printing face.
- ⊚: Within 0.1 percent
- ○: 0.1 percent or higher, but within 2.0 percent
- x: Higher than 2.0 percent Adhesive Force Test (Production of Test Piece)

An adhesive (product name Riki-Dyne, manufactured by VIGteQnos Co., Ltd.) was applied by 25 g/m² in solids content and then dried, on the release-treated face of a commercial release sheet on which a silicone release agent had been applied, to provide an adhesive layer. This adhesive layer, and the surface (second surface layer) of the water-dispersible paper opposite to its printing face, were put together and pressure-bonded by rolling a rubber roller weighing 3 kg back and forth over them twice, and the obtained sample was stored in a room of 23° C., 50% RH for 30 days.

(Measurement of Adhesive Force)

According to JIS Z0237, three test pieces, each of 25 mm wide×170 mm long in size, were cut out from the sample on day 30 following the application of the adhesive layer, and after peeling the release paper, were placed on a stainless-steel sheet (100×150 mm) with their adhesive application side facing down, and then pressure-bonded by rolling a rubber roller weighing 3 kg back and forth over them twice.

With the stainless-steel sheet clamped with the bottom chucks, and one end of the adhesive-treated sample clamped with the top chucks, of a tensile tester, a 180° peel test was conducted at a pulling speed of 300 mm/min to measure the adhesive force (g/25 mm) which was evaluated according to the criteria below:
- ⊚: 600 g/25 mm or higher
- ○: 300 g/25 mm or higher but under 600 g/25 mm
- x: Under 300 g/25 mm

TABLE 1

| | | | Example 1 | Example 2 | Example 3 | Example 4 | Example 5 | Example 6 | Example 7 | Example 8 | Example 9 | Example 10 |
|---|---|---|---|---|---|---|---|---|---|---|---|---|
| Dense layer | NBKP(l/D = 0.85) | parts by weight | | | 30 | 30 | 50 | 30 | 30 | 30 | 30 | 30 |
| | LBKP(l/D = 0.55) | parts by weight | | | 70 | 70 | 50 | | 70 | 70 | 70 | 70 |
| | LBKP(l/D = 0.34) | parts by weight | | | | | | 70 | | | | |
| | Canadian Standard Freeness | mlCSF | | | 525 | 590 | 525 | 525 | 525 | 525 | 590 | 590 |
| Bulky layer | NBKP(l/D = 0.42) | parts by weight | 100 | 50 | 50 | 50 | 50 | 50 | 70 | 50 | 50 | 50 |
| | LBKP(l/D = 0.34) | parts by weight | | 50 | 50 | 50 | 50 | 50 | | 50 | 50 | 50 |
| | LBKP(l/D = 0.85) | parts by weight | | | | | | | 30 | | | |
| | Canadian Standard Freeness | mlCSF | 700 | 640 | 640 | 640 | 640 | 640 | 640 | 640 | 640 | 640 |
| Dense layer | NBKP(l/D = 0.85) | parts by weight | | | 30 | 30 | 50 | 30 | 30 | 30 | 30 | 30 |
| | LBKP(l/D = 0.55) | parts by weight | | | 70 | 70 | 50 | | 70 | 70 | 70 | 70 |
| | LBKP(l/D = 0.34) | parts by weight | | | | | | 70 | | | | |
| | Canadian Standard Freeness | mlCSF | | | 525 | 590 | 525 | 525 | 525 | 525 | 590 | 590 |
| Water-soluble polymer | Type | | CMC | CMC | CMC | CMC | CMC | CMC | CMC | CMC | Dextrin | CMC/Dextrin |
| | Brookfield viscosity | mPa·s | 5 | 5 | 5 | 5 | 5 | 5 | 5 | 94 | 3 | 94/3 |

TABLE 1-continued

| | | | | | | | | | | | | |
|---|---|---|---|---|---|---|---|---|---|---|---|---|
| | Content (relative to base paper) | % by weight | 8 | 8 | 8 | 8 | 8 | 8 | 8 | 5 | 5 | 1/7 |
| Evaluation | Basis weight | g/m² | 58.6 | 59.9 | 60.4 | 58.9 | 60.2 | 60.3 | 60.5 | 59.8 | 60.2 | 60.1 |
| | Thickness | μm | 73.8 | 73.1 | 72.4 | 72.7 | 74.0 | 72.0 | 72.7 | 72.9 | 73.9 | 73.7 |
| | Density | g/cm³ | 0.79 | 0.82 | 0.83 | 0.81 | 0.81 | 0.84 | 0.83 | 0.82 | 0.81 | 0.82 |
| | Dispersibility in water | sec | ◎ | ◎ | ◎ | ◎ | ◎ | ◎ | ○ | ○ | ○ | ◎ |
| | Printability | % | X | ○ | ◎ | ◎ | ◎ | ◎ | ◎ | ◎ | ◎ | ◎ |
| | Adhesive force | g/25 mm | ○ | ○ | ◎ | ◎ | ◎ | ○ | ◎ | ◎ | ◎ | ◎ |

| | | | Example 11 | Example 12 | Example 13 | Example 14 | Comparative Example 1 | Comparative Example 2 | Comparative Example 3 | Comparative Example 4 |
|---|---|---|---|---|---|---|---|---|---|---|
| Dense layer | NBKP(l/D = 0.85) | parts by weight | 30 | | 30 | | | | 30 | 30 |
| | LBKP(l/D = 0.55) | parts by weight | 70 | | 70 | | | | 70 | 70 |
| | LBKP(l/D = 0.34) | parts by weight | | 100 | | | | | | |
| | Canadian Standard Freeness | mlCSF | 525 | 525 | 620 | | | | 525 | 525 |
| Bulky layer | NBKP(l/D = 0.42) | parts by weight | 50 | 50 | 50 | 30 | 100 | | | |
| | LBKP(l/D = 0.34) | parts by weight | 50 | 50 | 50 | 70 | | | | |
| | LBKP(l/D = 0.85) | parts by weight | | | | | | 100 | | 100 |
| | Canadian Standard Freeness | mlCSF | 640 | 640 | 640 | 630 | 700 | 640 | | 640 |
| Dense layer | NBKP(l/D = 0.85) | parts by weight | | | 30 | | | | 30 | 30 |
| | LBKP(l/D = 0.55) | parts by weight | | | 70 | | | | 70 | 70 |
| | LBKP(l/D = 0.34) | parts by weight | | 100 | | | | | | |
| | Canadian Standard Freeness | mlCSF | | 525 | 620 | | | | 525 | 525 |
| Water-soluble polymer | Type | | CMC | CMC | CMC | CMC | | CMC | CMC | CMC |
| | Brookfield viscosity | mPa·s | 5 | 5 | 5 | 5 | | 5 | 5 | 5 |
| | Content (relative to base paper) | % by weight | 8 | 8 | 8 | 8 | | 8 | 8 | 8 |
| Evaluation | Basis weight | g/m² | 60.5 | 60.1 | 60.4 | 60.7 | 53.9 | 60.9 | 58.4 | 60.8 |
| | Thickness | μm | 73.2 | 73.4 | 73.9 | 73.0 | 74.0 | 72.1 | 73.2 | 72.2 |
| | Density | g/cm³ | 0.83 | 0.82 | 0.82 | 0.84 | 0.73 | 0.84 | 0.80 | 0.84 |
| | Dispersibility in water | sec | ◎ | ◎ | ◎ | ◎ | X | X | X | X |
| | Printability | % | ◎ | ○ | ○ | ○ | X | ○ | ○ | ○ |
| | Adhesive force | g/25 mm | ○ | ○ | ○ | ○ | X | ○ | ◎ | ◎ |

Results

The water-dispersible papers obtained in Examples 1 to 14, which were conforming to the present invention, had excellent dispersibility in water. Examples 3 to 13 conforming to the present invention and having a dense layer on the surface, and especially the inventions pertaining to Examples 3 to 11 where the pulps constituting the dense layer included 30% by weight or higher of a softwood pulp whose (l/D) exceeds 0.60 on average, and were beaten to a level of 450 ml CSF or higher but no higher than 600 ml CSF, demonstrated excellent printability.

What is claimed is:

1. A water-dispersible paper characterized by comprising:
a base paper that has a bulky layer containing, relative to a total amount of pulp contained in the bulky layer, 10% by weight or higher of a softwood pulp constituted by pulp fibers with a lumen width (l) to fiber diameter (D) ratio (l/D) of 0.60 or lower on average, and a dense layer which is denser than the bulky layer wherein the dense layer and bulky layer are not formed from a same paper material; and
a water-soluble polymer impregnated into the base paper.

2. The water-dispersible paper according to claim 1, characterized in that a freeness of the pulp constituting the bulky layer is 600 ml CSF or higher but no higher than 750 ml CSF.

3. The water-dispersible paper according to claim 2, characterized in that the dense layer contains, relative to a total amount of pulp contained in the dense layer, 30% by weight or higher of a softwood pulp constituted by pulp fibers with a lumen width (l) to fiber diameter (D) ratio (l/D) exceeding 0.60 on average, and is formed on at least one surface of the base paper.

4. The water-dispersible paper according to claim 3, characterized in that the water-soluble polymer comprises either one or both of a carboxyalkyl cellulose salt and a dextrin.

5. The water-dispersible paper according to claim 2, characterized in that the water-soluble polymer comprises either one or both of a carboxyalkyl cellulose salt and a dextrin.

6. The water-dispersible paper according to claim 1, characterized in that the dense layer contains, relative to a total amount of pulp contained in the dense layer, 30% by weight or higher of a softwood pulp constituted by pulp fibers with a lumen width (l) to fiber diameter (D) ratio (l/D) exceeding 0.60 on average, and is formed on at least one surface of the base paper.

7. The water-dispersible paper according to claim 6, characterized in that a freeness of the pulp constituting the dense layer is 450 ml CSF or higher but no higher than 600 ml CSF.

8. The water-dispersible paper according to claim 7, characterized in that the water-soluble polymer comprises either one or both of a carboxyalkyl cellulose salt and a dextrin.

9. The water-dispersible paper according to claim 6, characterized in that the water-soluble polymer comprises either one or both of a carboxyalkyl cellulose salt and a dextrin.

10. The water-dispersible paper according to claim 1, characterized in that the water-soluble polymer comprises either one or both of a carboxyalkyl cellulose salt and a dextrin.

11. A water-dispersible label, being the water-dispersible paper according to claim 1 with an adhesive layer provided on one side.

12. An information sheet comprising the water-dispersible paper according to claim 1.

13. A water-dispersible label, being the water-dispersible paper according to claim 2 with an adhesive layer provided on one side.

14. An information sheet comprising the water-dispersible paper according to claim 2.

15. A water-dispersible label, being the water-dispersible paper according to claim 6 with an adhesive layer provided on one side.

16. An information sheet comprising the water-dispersible paper according to claim 6.

17. A water-dispersible label, being the water-dispersible paper according to claim 7 with an adhesive layer provided on one side.

18. An information sheet comprising the water-dispersible paper according to claim 7.

19. A water-dispersible label, being the water-dispersible paper according to claim 10 with an adhesive layer provided on one side.

20. An information sheet comprising the water-dispersible paper according to claim 10.

* * * * *